United States Patent
Gross

(10) Patent No.: US 11,513,772 B1
(45) Date of Patent: Nov. 29, 2022

(54) SYSTEM AND METHOD OF PROVIDING AN INTERACTIVE DEVELOPMENT PLATFORM IN A DISTRIBUTED COMPUTING ENVIRONMENT

(71) Applicant: DATAPLATE LTD., Mazkeret Batya (IL)

(72) Inventor: Amit Gross, Kfar Saba (IL)

(73) Assignee: DATAPLATE LTD., Mazkeret Batya (IL)

( * ) Notice: Subject to any disclaimer, the term of this patent is extended or adjusted under 35 U.S.C. 154(b) by 0 days.

(21) Appl. No.: 17/728,715

(22) Filed: Apr. 25, 2022

Related U.S. Application Data

(60) Provisional application No. 63/235,747, filed on Aug. 22, 2021.

(51) Int. Cl.
*G06F 8/30* (2018.01)
*H04L 67/10* (2022.01)
*H04L 67/564* (2022.01)

(52) U.S. Cl.
CPC .............. *G06F 8/30* (2013.01); *H04L 67/10* (2013.01); *H04L 67/564* (2022.05)

(58) Field of Classification Search
CPC ......... G06F 8/30; H04L 67/564; H04L 67/10; H04L 67/562; G06Q 10/0633; G06Q 10/103
See application file for complete search history.

(56) References Cited

U.S. PATENT DOCUMENTS

| | | | |
|---|---|---|---|
| 9,680,654 B2 | 6/2017 | Lam | |
| 9,760,602 B1 | 9/2017 | Ghodsi et al. | |
| 9,935,772 B1 | 4/2018 | Madisetti et al. | |
| 10,361,928 B2 | 7/2019 | Ghodsi et al. | |
| 10,419,462 B2 | 9/2019 | Muddu et al. | |
| 10,467,430 B1 | 11/2019 | Clark et al. | |

(Continued)

OTHER PUBLICATIONS

Mohammadmahdi R. Yousefi et al.; Multiple-rule bias in the comparison of classification rules; Bioinformatics; pp. 1675-1683; retrieved on Jul. 18, 2022 (Year: 2011).*

(Continued)

*Primary Examiner* — S. Sough
*Assistant Examiner* — Cuong V Luu
(74) *Attorney, Agent, or Firm* — The Roy Gross Law Firm, LLC; Roy Gross

(57) ABSTRACT

A system and method of providing an interactive development environment include providing a proxy server, adapted to interface at least one cloud-based platform and one or more client modules, operatively connected to the proxy server, where each client module is associated with a respective user development platform. At least one client module receives, from the respective user development platform, one or more interactive computing documents, commonly referred to as notebooks, each representing one or more scripting code elements, commonly referred to as cells. The proxy server scans the one or more cells, according to a set of predetermined scripting rules, and encapsulates one or more notebooks in one or more data containers, based on the scan. The proxy server may subsequently transmits the one or more data containers to the at least one cloud-based platform, to execute at least one cell of the one or more notebooks.

19 Claims, 5 Drawing Sheets

(56) References Cited

U.S. PATENT DOCUMENTS

| | | |
|---|---|---|
| 10,474,501 B2 | 11/2019 | Ghodsi et al. |
| 10,585,593 B2 | 3/2020 | Chan et al. |
| 10,812,531 B2 | 10/2020 | Narayanaswamy et al. |
| 2013/0311420 A1* | 11/2013 | Tehranchi ............ G06Q 30/018 707/608 |
| 2014/0173618 A1 | 6/2014 | Neuman et al. |
| 2018/0191759 A1 | 7/2018 | Baijal et al. |
| 2020/0151630 A1* | 5/2020 | Shakhnovich ..... G06Q 10/0633 |

OTHER PUBLICATIONS

Wenmin Li; CMAR: Accurate and Efficient Classification Based on Multiple Class-association Rules; IEEE; pp. 369-376; retrieved on Jul. 18, 2022 (Year: 2001).*

Mitre ATT&CK®. (2015-2022). Mitre ATT&CK, https://attack.mitre.org/.

Stack Overflow—Where Developers Learn, Share, & Build Careers. (2022). Stack Overflow, https://stackoverflow.com/.

GitHub: Where the world builds software. (2022). GitHub. https://github.com/.

* cited by examiner

SYSTEM AND METHOD OF PROVIDING AN INTERACTIVE DEVELOPMENT PLATFORM IN A DISTRIBUTED COMPUTING ENVIRONMENT

CROSS-REFERENCE TO RELATED APPLICATIONS

This application claims the benefit of U.S. Patent Application No. 63/235,747, filed Aug. 22, 2021, entitled "A SYSTEM AND METHOD TO MANAGE, FOLLOW, SECURE AND OPTIMIZE DATA ACCESS", which is hereby incorporated by reference in its entirety.

FIELD OF THE INVENTION

The present invention relates to the growing field of data engineering. More precisely, the present invention relates to providing an interactive development platform in distributed computing environments.

BACKGROUND OF THE INVENTION

Reference is now made to FIG. 1 which is a schematic diagram, depicting a workflow of generating a machine learning (ML) model in a production environment.

Modern data research is typically done interactively, by running scripting commands on large data sets that consume large amounts of memory in a development environment, and validating the result of these commands online. This process stands in contrast to "classic" code engineering, in which code is fully written in the development environment, and subsequently compiled and debugged to check the results.

As known in the art, and shown in FIG. 1, a typical process for generating an ML model may include several disciplines. One such discipline may be that of a research engineer, or a data scientists, set to analyze or ingest big data. Another discipline may be that of a data engineer, who may be set to produce a model (e.g., a NN model), that may be applied on incoming data instances or examples. A third discipline may be that of an automation engineer, who may be set to automate training and/or inference of the ML model on large amounts of data, during training, testing and/or operational work modes.

Automation engineers, data analysts, data engineers, data scientists and researchers work with various cloud computing platforms and access different kinds of data using multiple, and different Application Programming Interfaces (APIs).

The process of transferring between data research and production requires utilization of a wide variety of code languages and repositories. For example, the different engineers and researchers typically need to employ a variety of development environments. Some of these development environments may be implemented on local computing environments (e.g., installed on computers within an organizational computer network), while others may be implemented using remote computing resources and platforms (e.g., Amazon SageMaker notebooks, and the like).

Additionally, the process of producing an operational ML model requires intensive, iterative communication between the different disciplines. For example, as depicted in FIG. 1, a data scientist may acquire large amounts of data, to be iteratively validated and/or prepared or processed by a data engineer.

In another example, the creation and/or training of an ML model (e.g., a NN architecture) typically requires multiple iterations and experimentations.

In another example, a data engineer may need to communicate with an automation engineer in an arduous, iterative process, to automate the execution of the ML model. Automation engineers normally need to review the data scientists' code, (typically written in an interactive development environment such as Jupyter notebooks), split that code into scripts and then automate the process using a workflow engine that supports these scripts. This typically results in a high-maintenance, communication-extensive iterative process between data teams and engineering teams.

In yet another example, production-level ML models require continuous maintenance and debugging, as additional data samples are introduced.

It may be appreciated by a person skilled in the art that the currently available, multi-level and multi-platform process, as depicted in FIG. 1 results in a chasm between the original source code that may have been written by the data scientist, and the outcome pipeline code, that serves the automation engineer. For example, during maintenance or debugging of a production-level model, a data scientist may find it very difficult to associate their original source code (e.g., written as an Amazon SageMaker notebook), and the pipeline scripting code that was eventually executed.

In order to reduce the cycle of data research en-route generating a production solution, currently-available systems for ML production typically run the interactive code on cloud platforms. Due to extensive consumption of computing resources (e.g., data, memory, process-power), there is growing need to optimize the cost and run-time of these computing resources. This is particularly relevant in applications using ML models.

Additionally, the multitude of data access requests, and data transferals among the different platforms and levels typically makes the task of maintaining production data security a daunting one. Access of production data, that may consist of sensitive or private information may be challenging, as it requires definition and enforcement of complex roles and policies over all cloud computing platforms.

In other words, cloud computing solutions may be required to mitigate or prevent compromise of production data, and also provide information regarding unauthorized access to this data (e.g., who accessed what data, and for how long). This may require extraction of logs from multiple systems, over different cloud computing platforms.

Additionally, in case of a suspected data breach or a security concern, there is an instant need to perform mitigation actions that would include, for example, blocking access to breached data. However, since the data, once accessed, is on other (e.g., local, or remote) computing environments, this mission may become very challenging. For example, an unwary data user (e.g., a data-scientist or software engineer) or a malicious perpetrator may save copies of breached data, making the breach of data hard to follow, in effort to avoid further data leakage and data exfiltration risks.

SUMMARY OF THE INVENTION

As elaborated herein, embodiments of the invention may enable data scientists, data engineers and automation engineers to safely access production data, and run automation workflows via an interactive development environment. The term "safely" may be used in this context in the sense that embodiments of the invention may enforce one or more scripting rules, and/or one or more run-time rules to mitigate or prevent data breach, and minimize the risk for data exfiltration.

Additionally, embodiments of the invention may also determine and/or enforce one or more security rules. Such rules may, for example, dictate what actions need to be done in case a specific data breach has been identified. For example, embodiments may determine that specific users or services would be denied access to data, that specific roles and/or permissions need to be revoked, and the like.

It may be appreciated that each type of cloud computing platform may require unique APIs and technologies, and incur different costs for accessing or processing resident data. As elaborated herein, embodiments of the invention may be configured to interact with a variety of data services and/or cloud computing platforms, to optimally execute computing code on the production data, via the interactive development environment. The term "optimally" may be used in this context in the sense that embodiments of the invention may enforce one or utilization rules to provide optimal execution of the computing code in relation to predefined metrics, such as cost metrics, throughput metrics, speed metrics and the like.

Embodiments of the invention may include a proxy server for providing an interactive development environment. The proxy server may be configured to operatively connect to one or more client modules, each associated with a respective user development platform; receive, from at least one client module of the one or more client modules, one or more interactive computing documents such as Jupyter notebooks. Each such interactive computing document may include one or more scripting code elements also referred to herein as cells or code lines.

According to some embodiments, the proxy server may be configured to scan the one or more scripting code elements according to a set of predetermined scripting rules; encapsulate the one or more interactive computing documents in one or more data containers, based on said scan; and transmit the one or more data containers to at least one cloud-based platform, to execute at least one scripting code element of the one or more interactive computing documents.

According to some embodiments, the proxy server may receive, from the at least one client module, a workflow data element, defining a scheme for executing the one or more interactive computing documents. The proxy server may encapsulate the workflow data element with the one or more interactive computing documents in the one or more data containers; and transmit the one or more data containers to at least one cloud-based platform, to execute the at least one scripting code element of one or more interactive computing documents according to the execution scheme, as defined by the workflow data element.

According to some embodiments, the scheme for executing the one or more interactive computing documents may include at least one of: (a) scheduling of execution of one or more interactive computing documents; (b) an order of execution of one or more interactive computing documents; (c) a condition for executing one or more interactive computing documents; and (d) concurrence of execution of two or more interactive computing documents.

Additionally, or alternatively, the one or more interactive computing documents may include document metadata. The proxy server may be configured to scan the document metadata according to a set of predetermined metadata rules; and encapsulate the workflow data element and the one or more interactive computing documents in one or more data containers, based on said scan of document metadata (e.g., when the document metadata was approved by the scan).

Additionally, or alternatively, the proxy server may receive, from the at least one client module, at least one execution parameter value, associated with a specific interactive computing document. The proxy server may inject the received execution parameter value as metadata into the relevant interactive computing document; and further encapsulate the document metadata in the one or more data containers. The at least one cloud-based platform may, in turn, be configured to execute the at least one scripting code element of the one or more interactive computing documents according to document metadata.

According to some embodiments, the proxy server may be configured to accumulate a subset of scripting code elements, each representing one or more data actions. The term "data actions" may refer herein to any action that may be performed on data, including for example: accessing data (e.g., reading data writing data, deleting data, etc.) that is stored on a computing device such as a cloud-based platform, importing software modules, running, or executing specific commands or sets of commands on the computing device, and the like. The proxy server may classify the subset of scripting code elements, in relation to at least one client module, to one or more categories or classifications (e.g., legitimate action, illegitimate action, and the like). For example, proxy server may classify the subset of scripting code elements in relation to a specific client module that initiated the data action. The proxy server may subsequently determine at least one scripting rule based on said classifications.

Additionally, or alternatively, the proxy server may include, or be associated with a feature extraction module, configured to extract one or more data action features from at least one specific scripting code element of the subset of scripting code elements. The proxy server may also include, or be associated with an ML based model (e.g., a classification model), configured to classify the specific scripting code element according to the one or more data action classifications, based on the one or more data action features.

Additionally, or alternatively, the proxy server may be configured to obtain, from the ML based model, a confidence score, representing pertinence of one or more scripting code elements to the one or more data action classifications; and determine at least one scripting rule based on the confidence score. The proxy server may subsequently enforce the at least one scripting rule on one or more scripting code elements, as elaborated herein.

According to some embodiments, the proxy server may be configured to encapsulate the workflow data element and the one or more interactive computing documents by: encapsulating the workflow data element in a first data container; spawning one or more second data containers, each encapsulating one or more interactive computing documents of the one or more interactive computing documents based on the workflow data element; and transmitting the one or more second data containers to the at least one cloud-based platform according to the execution scheme, as defined by the workflow data element.

According to some embodiments, the proxy server may include, or be associated with a monitoring module, adapted to monitor execution of the scripting code elements (of the one or more interactive computing documents) by the at least one cloud-based platform. The proxy server may also include, or be associated with a rule engine module, which may be adapted to identify a problem in execution according to a set of predefined runtime rules (e.g., upon triggering of a runtime rule) based on said monitoring, as elaborated herein.

For example, the rule engine module may be configured to communicate a notification message to a relevant client module (e.g., a client module which initiated the relevant scripting code element). The notification message may include a representation of the identified execution problem, to be displayed on a user interface (UI) of the user development platform.

In another example, the rule engine module may be configured to perform at least one mitigation action, according to the identified execution problem (e.g., according to the triggered runtime rule). The mitigation action may include, for example blocking a user of a specific client module from accessing data stored on the at least one cloud-based platform, changing an access permission of a role of a user of a specific client module to a specific cloud-based platform, deleting data footprints of the at least one executed scripting code element, disabling a specific user of a specific client module from executing scripting code elements in their user development platform, and the like.

Additionally, or alternatively, the proxy server may monitor execution of the scripting code elements by performing run-time monitoring of logs generated by the at least one cloud-based platform; run-time monitoring of an order of execution of the scripting code elements; run-time monitoring of output of the executed scripting code elements; monitoring duration of execution of at least one scripting code element of the one or more interactive computing documents; performing a comparison between output statistics of a current execution of an interactive computing document and output statistics of a previous execution of the interactive computing document; identifying at least one difference between an output of a specific scripting code element at a first execution and an output of the specific scripting code element at a second execution; identifying at least one difference between a first metadata element, associated with a specific scripting code element at a first execution and a second metadata element, associated with the specific scripting code element at a second execution; and any combination thereof.

Additionally, or alternatively, the monitoring module may be adapted to monitor execution of the scripting code elements of the one or more interactive computing documents by the at least one cloud-based platform; produce a log data element, representing said monitored execution of the scripting code elements; and communicate the log data element to a relevant client module (e.g., a client module which initiated, or sent the relevant interactive code element). The proxy server may send the log data element in real-time or near real time, to facilitating an aspect of interactivity of execution of the interactive code element. The client module may, in turn, be configured to display the log data element on a UI of the user development platform.

Embodiments of the invention may include a system for providing an interactive development environment. Embodiments of the system may include a proxy server module, adapted to interface at least one cloud-based platform; and one or more client modules operatively connected to the proxy server, where each client module may be associated with a respective user development platform.

According to some embodiments, the at least one client module of the one or more client modules may be configured to receive, from the respective user development platform, one or more interactive computing documents, each representing one or more scripting code elements; and transmit the one or more interactive computing documents to the proxy server. The proxy server may be configured to scan the one or more scripting code elements according to a set of predetermined scripting rules; encapsulate the one or more interactive computing documents in one or more data containers, based on said scan; and transmit the one or more data containers to the at least one cloud-based platforms, to execute at least one scripting code element of the one or more interactive computing documents.

Additionally, or alternatively, the at least one client module may be configured to produce a workflow data element, defining a scheme for executing the one or more interactive computing documents; and transmit the workflow data element to the to the proxy server. The proxy server may be configured to transmit the one or more data containers and the workflow data element to the at least one cloud-based platforms, to execute the one or more interactive computing documents according to the execution scheme, as defined by the workflow data element.

According to some embodiments, the proxy server may be configured to encapsulate the workflow data element with the one or more interactive computing documents in the one or more data containers.

Additionally, or alternatively, the proxy server may be further configured to, during execution of the one or more interactive computing documents, scan at least one scripting code element according to the set of predetermined scripting rules, to verify at least one of (a) permission-based legitimacy of data retrieval by the at least one scripting code element, and (b) lack of malicious activity in the at least one scripting code element.

Embodiments of the invention may include a method of providing an interactive development environment. Embodiments of the method may include providing a proxy server module, adapted to interface at least one cloud-based platform; providing one or more client modules, operatively connected to the proxy server, where each client module may be associated with a respective user development platform; receiving by at least one client module, from the respective user development platform, one or more interactive computing documents, each representing one or more scripting code elements; scanning the one or more scripting code elements by the proxy server, according to a set of predetermined scripting rules; encapsulating, by the proxy server, the one or more interactive computing documents in one or more data containers, based on said scan; and transmitting, by the proxy server, the one or more data containers to the at least one cloud-based platforms, to execute at least one scripting code element of the one or more interactive computing documents.

Embodiments of the invention may further include producing, by the at least one client module, a workflow data element, defining a scheme for executing the one or more interactive computing documents; encapsulating, by the proxy server, the workflow data element with the one or more interactive computing documents in the one or more data containers; and transmitting, by the proxy server, the one or more data containers to the at least one cloud-based platforms, to execute the one or more interactive computing documents according to the execution scheme, as defined by the workflow data element.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
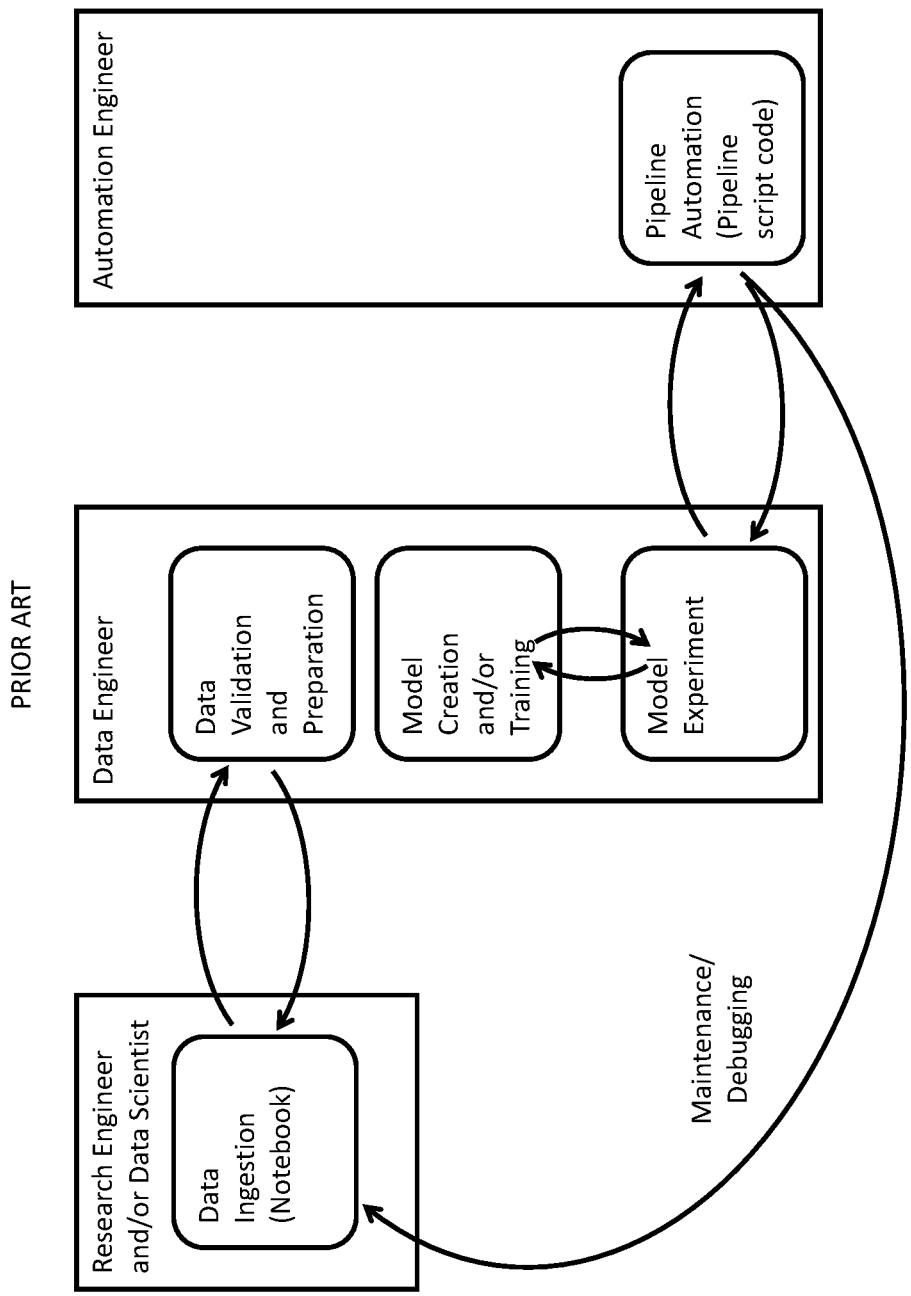
FIG. 1 is a schematic diagram, depicting a workflow of generating a machine learning model in a production environment, as known in the art.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items.

Unless explicitly stated, the method embodiments described herein are not constrained to a particular order or sequence. Additionally, some of the described method embodiments or elements thereof can occur or be performed simultaneously, at the same point in time, or concurrently.

Figure 2:
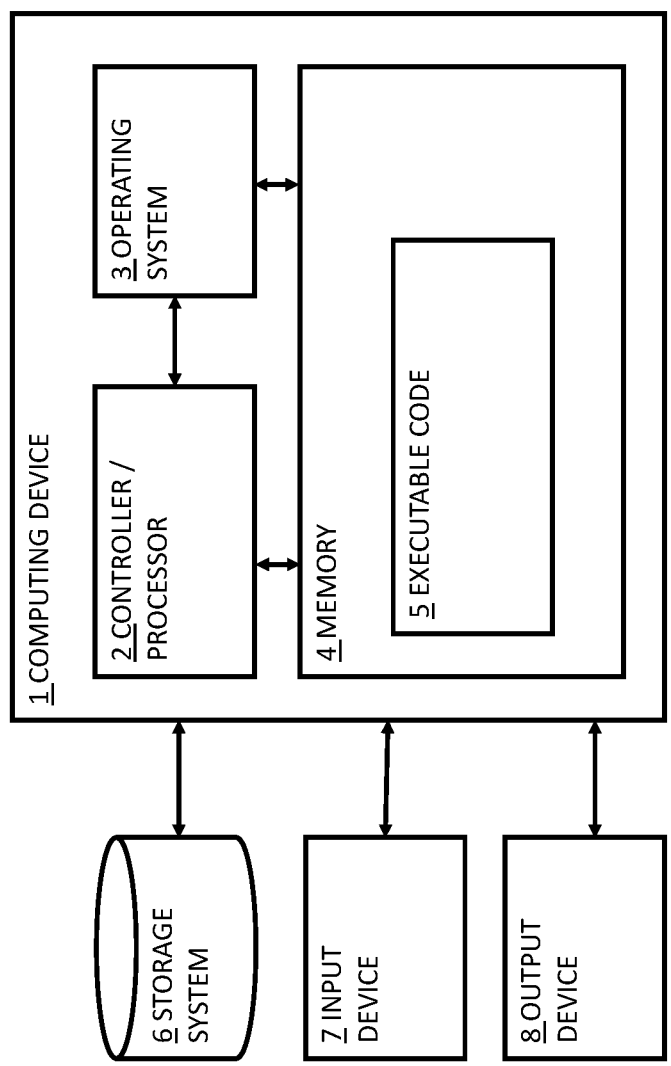
FIG. 2 is a block diagram, depicting a computing device which may be included in a system for providing an interactive development platform in a distributed computing environment, according to some embodiments of the invention.

Reference is now made to FIG. 2, which is a block diagram depicting a computing device which may be included in a system for providing an interactive development platform in a distributed computing environment, according to some embodiments of the invention.

Computing device 1 may include a processor or controller 2 that may be, for example, a central processing unit (CPU) processor, a chip or any suitable computing or computational device, an operating system 3, a memory 4, executable code 5, a storage system 6, input devices 7 and output devices 8. Processor 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random-Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of possibly different memory units. Memory 4 may be a computer or processor non-transitory readable medium, or a computer non-transitory storage medium, e.g., a RAM. In one embodiment, a non-transitory storage medium such as memory 4, a hard disk drive, another storage device, etc. may store instructions or code which when executed by a processor may cause the processor to carry out methods as described herein.

Executable code 5 may be any executable code, e.g., an application, a program, a process, task or script. Executable code 5 may be executed by processor or controller 2 possibly under control of operating system 3. For example, executable code 5 may be an application that may provide an interactive development environment, as further described herein. Although, for the sake of clarity, a single item of executable code 5 is shown in FIG. 2, a system according to some embodiments of the invention may include a plurality of executable code segments similar to executable code 5 that may be loaded into memory 4 and cause processor 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Data pertaining to an interactive development environment may be stored in storage system 6 and may be loaded from storage system 6 into memory 4 where it may be processed by processor or controller 2. In some embodiments, some of the components shown in FIG. 2 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., similar to element 2), a plurality of input units, a plurality of output units, a plurality of memory units, and a plurality of storage units.

A neural network (NN) or an artificial neural network (ANN), e.g., a neural network implementing a machine learning (ML) or artificial intelligence (AI) function, may refer to an information processing paradigm that may include nodes, referred to as neurons, organized into layers, with links between the neurons. The links may transfer signals between neurons and may be associated with weights. A NN may be configured or trained for a specific task, e.g., pattern recognition or classification. Training a NN for the specific task may involve adjusting these weights based on examples. Each neuron of an intermediate or last layer may receive an input signal, e.g., a weighted sum of output signals from other neurons, and may process the input signal using a linear or nonlinear function (e.g., an activation function). The results of the input and intermediate layers may be transferred to other neurons and the results of the output layer may be provided as the output of the NN. Typically, the neurons and links within a NN are represented by mathematical constructs, such as activation functions and matrices of data elements and weights. A processor, e.g., CPUs or graphics processing units (GPUs), or a dedicated hardware device may perform the relevant calculations.

Figure 3:
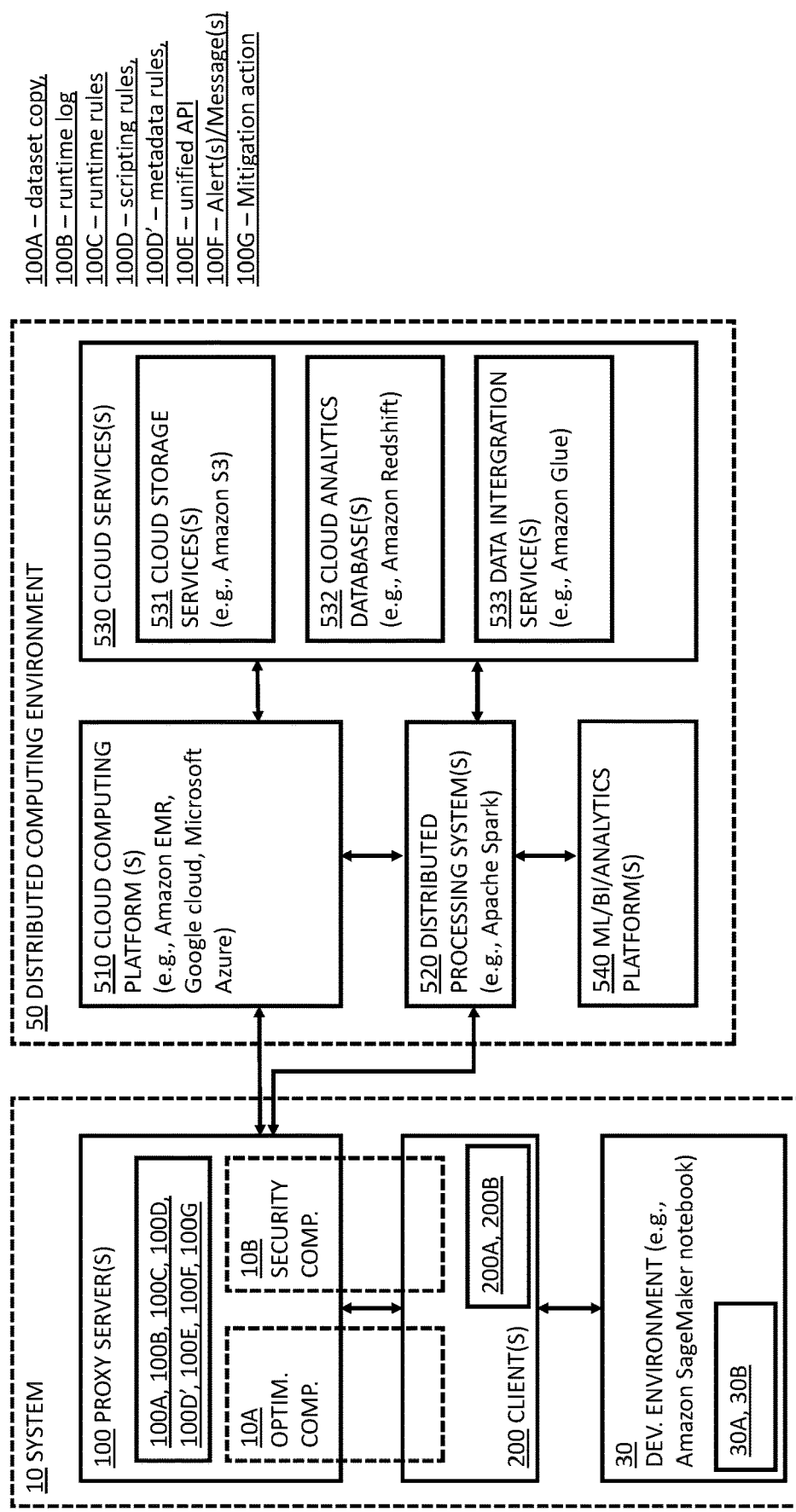
FIG. 3 is a block diagram, depicting application of a system for providing an interactive development platform in a distributed computing environment, according to some embodiments of the invention.

Reference is now made to FIG. 3, which depicts an example of an application of a system 10 for providing an interactive development platform in a distributed computing environment 50, according to some embodiments of the invention.

As elaborated herein, system 10 may be, or may include a client-server platform, configured to manage access and processing of production data, via an interactive development environment, in an optimized and secure manner.

According to some embodiments of the invention, system 10 may be implemented as a software module, a hardware module, or any combination thereof. For example, system 10 may be or may include a computing device such as element 1 of FIG. 2, and may be adapted to execute one or more modules of executable code (e.g., element 5 of FIG. 2) to manage access and processing of production data, as further described herein.

As shown in FIG. 3, arrows may represent flow of one or more data elements to and from system 10 and/or among modules or elements of system 100. Some arrows have been omitted in FIG. 3 for the purpose of clarity.

According to some embodiments, system 10 may include one or more client modules 200 that may be integrated into, or may collaborate with a development environment 30 such as Amazon Sagemaker notebook. Additionally, system 10 may include at least one proxy server module 100 that may be integrated into, or may collaborate with a plurality of cloud computing platforms 510 such as Amazon EMR, Google cloud and Microsoft Azure, and distributed processing systems 520 such as Apache spark.

According to some embodiments, the at least one proxy server module 100 and the one or more client modules 200 may be implemented on the same computing device (e.g., element computing device 1 of FIG. 2). Alternatively, the at least one proxy server module 100 and the one or more client modules 200 may be implemented on separate computing devices 1, and may be communicatively connected via a computer communication network, such as the Internet.

As known in the art, cloud computing platforms 510 and/or distributed processing systems 520 may facilitate access to a large variety of cloud based services 530, including for example cloud storage services and resources 531 such as Amazon S3, cloud analytics databases 532 such as machine-learning (ML) or Business Intelligence (BI) analytics engines (e.g., Amazon Redshift), and data integration services 533 such as Amazon glue.

As elaborated herein, system 10 may provide centralized hub for following, detecting, and/or preventing data access to various cloud platforms and data providers. System 10 may identify violations of predefined access rules or privileges, and produce recommendations for implementation of actions upon identification of such conditions, to prevent compromise of production data.

According to some embodiments, system 10 may collaborate, or be integrated into interactive development environments such as Jupyterlab, Zeppelin, and the like. The term "interactive" may be used in this context to indicate that development environment 30 may enable a user (e.g., a developer) to interactively or iteratively analyze data and see the results of their analysis (e.g., in the form of datasets, graphic displays, and the like), during, or as part of the development process. In a similar manner, the term "interactive computing documents" may be used herein to refer to data elements such as Jupyter notebooks, that may be employed by system 10 to facilitate this quality of interactivity during, or following the process of development, as elaborated herein.

According to some embodiments, system 10 may include an optimization component 10A, adapted to implement a data access optimization process. The system optimization component may gather historical statistic data from previous executions of scripts in an interactive development environment 30 such as Jupyter Notebook. Such historical statistic data may include, for example metadata representing processing time of scripting code elements (SCEs) such as Notebook cells, an amount (e.g., in data bytes) of data that had been accessed (e.g., read access, write access) by the SCEs, a size of datasets resulting from execution of the SCEs, one or more types or properties of execution solution (e.g., computing devices or platforms used for processing the SCEs), and the like.

The optimization component may subsequently, and automatically choose a configuration that provides optimal execution of target SCEs in relation to predefined metrics, such as cost metrics, throughput metrics, speed metrics and the like.

For example, the optimization component may automatically select, and/or configure a cloud computing platform 510 such as Amazon EMR, Google Cloud or Microsoft Azure, to provide optimal execution of one or more target SCEs (e.g., cells) in an interactive development environment 30 such as Jupyter Notebook.

In another example, the optimization component may automatically select, and/or configure a cloud solution such a cloud based service 530 (e.g., cloud storage services 531, cloud analytics databases 532 and/or data integration services 533), to provide an optimal execution of the one or more target SCEs.

In another example, the optimization component may automatically select or configure a number, a type, and/or one or more properties of computing devices of distributed processing systems 520. Such properties may include, for example a size of memory associated with the distributed processing systems 520, a number and/or a type of processing cores associated with the distributed processing systems 520, and the like.

According to some embodiments, proxy server 100 may by operatively connected to one or more client modules 200, each associated with, or included in a respective user development platform 30.

For example, development platform 30 may be, or may include a platform such as Amazon's Sagemaker, where a user or developer may draft or write one or more interactive computing documents (ICDs) 30A, commonly referred to as notebook documents (or "notebooks", for short). The terms "interactive computing documents", "ICD" and "notebooks" may be used herein interchangeably. Additionally, each such notebook document 30A may include one or more scripting code elements (SCEs) 30B, commonly referred to as "cells". The terms "scripting code elements", "SCE", and "cells" may be used herein interchangeably.

According to some embodiments, each client module 200 may associated with a respective development platform 30. For example, client module 200 may be implemented as a software module or an add-on that may interface, or communicate with a respective development platform 30 (e.g., the Sagemaker platform). Client module 200 may also operatively connect to, or communicate with one or more proxy servers 100 on the other hand, to provide capabilities of system 10 as elaborated herein.

In some embodiments, development platform 30 and client module 200 may be installed, or included on the same computing device, such as computing device 1 of FIG. 2. Alternatively, development platform 30 and client module 200 may be implemented on separate computing devices 1, and may be communicatively connected via a computer network such as the Internet.

According to some embodiments, client 200 may receive, from development platform 30 one or more ICDs (e.g., notebooks) 30A, that may include one or more SCEs (e.g., cells) 30B. Client 200 may transmit the one or more received ICDs 30A to proxy server 100, for example as a data action, such as a data access request 200B. Proxy server 100 may, in turn receive the one or more data actions (e.g., data access requests) 200B (e.g., ICD 30A) from at least one client module 200, and may communicate with distributed computing environment 50 to execute, or process the one or more data actions (e.g., data access requests 200B) (e.g., ICDs 30A) on cloud computing platforms 510 of the distributed computing environment 50.

As elaborated herein, proxy server 100 and client 200 may jointly implement an optimization aspect or component 10A of system 10, to improve aspects of efficiency in execution of one or more cells 30B.

For example, proxy server 100 may implement a caching system, to improve throughput or latency of execution. For example, proxy server 100 may be configured to maintain (e.g., in storage 6 of FIG. 2) historical results of executed cell 30B processes. Proxy server 100 may receive from one or more clients 200 one or more new cells 30B, to be executed or processed in distributed computing environment 50. Proxy server 100 may automatically select whether to return previously retrieved results from cache (e.g., from storage 6), or communicate the newly received cells to distributed computing environment 50, in order to re-run the processing.

In another example, client 200 may be configured to scan a source code in one or more notebooks 30A or cells 30B received from interactive development environment 30 according to a predetermined set of rules, to find failures in the source code. Client 200 may transmit a notification message 200A to server 100, that may include information regarding outcome of the scan. Such information may include, for example, whether any failures in the source code were found and/or whether the server is required to perform further analysis to decide whether any optimization actions are required. For example, failure of execution of source code in a cell 30B may be caused due to timeout of processing or lack of memory in a cloud computing platforms 510. In such a condition, proxy server 100 may determine that an upgrade (e.g., addition of memory space and or additional allocation of processors) of cloud computing platforms 510 is required.

In another example, client 200 may be configured to scan a source code of cells 30B to identify indications in the source code that require usage of specific, or special computing devices. For example, client 200 may identify code snippets that make use of "GPU" or "CUDA" indications, or require usage of machine-learning libraries or APIs such as TensorFlow or Keras. Client 200 may transmit an indication 200A of such findings to proxy server 100 for further analysis, to decide whether a GPU or TPU computing device should be used for processing or retrieving source code of the scanned cell 30B.

Additionally, or alternatively, and as elaborated herein, proxy server 100 and client 200 may jointly implement a security aspect or component 10B of system 10, to improve aspects of data security prior to, and during execution of one or more cells 30B.

For example, proxy server 100 and/or client 200 may be configured to perform a preemptive scan of one or more SCEs of the interactive development environment 30 (e.g., source code included in notebooks 30A and/or cells 30B) according to one or more (e.g., a set of) predetermined scripting rules 100D. The term "preemptive" may be used herein to indicate a scan that may be performed prior to communicating the cells' 30B source code to distributed computing environment 50 for processing.

For example, during a preemptive scan, proxy server 100 may be configured to scan source code of one or more cells 30B based on the predetermined scripting rules 100D, to find utilization of elements such as commands, actions, API calls and import objects (e.g., libraries such as Pandas, AWS Data wrangler or direct spark commands) that may be used to retrieve data from distributed computing environment 50 in a manner that circumvents, or is not performed via system 10. Proxy server 100 may log such occurrences, and/or implement preemptive measures or actions to mitigate or avoid risk of data exfiltration. For example, proxy server 100 may be configured to block access of a specific entity (e.g., a specific client 200, a specific user, a specific account or role, a specific cell or notebook, and the like) to relevant elements (e.g., cloud services 530, cloud computing platforms or clusters 510, datasets and the like) of distributed computing environment 50.

Additionally, or alternatively, proxy server 100 and/or client 200 may be configured to perform a runtime scan of one or more SCEs of the interactive development environment 30. The term "runtime" may be used herein to indicate a scan that may be performed in conjunction to running, or execution of source code in one or more cells 30B or notebooks 30A.

For example, during a runtime scan, proxy server 100 may track manipulation and/or diversion of data (or a data-set, as commonly referred to in the art) retrieved from distributed computing environment 50.

In some embodiments, proxy server 100 may hold a copy 100A of one or more relevant, retrieved elements of the data-set. Additionally, or alternatively, proxy server 100 may maintain a runtime log 100B of actions that have been performed on data elements in the data-set. Runtime log 100B may include, for example, code lines of executed data manipulations, timestamps of executed data manipulations, results or outputs of executed data manipulations, relevant object names, relevant file names, relevant database tables and the like.

According to some embodiments, during (e.g., as part of) the runtime scan, proxy server 100 may be configured to continuously (e.g., repeatedly, over time) perform runtime analysis of the copy 100A of one or more elements of the data-set (referred to herein as "copy 100A") and/or runtime log 100B. In this runtime analysis, proxy server 100 may be configured to find relevant data elements and corresponding relevant commands, that may be regarded as suspicious, according to a predetermined set of runtime rules 100C.

For example, a runtime rule 100C may be implemented as a data structure (e.g., a table), that may associate at least one element in distributed computing environment 50 (e.g., a portion of a dataset) with at least one rule or restriction to be imposed upon that element. For example, a runtime rule 100C may dictate that at least one data element of a dataset stored by a cloud storage service 531 of distributed computing environment 50 may be prohibited from being stored elsewhere (e.g., locally), on a storage device (e.g., element 6 of FIG. 2) associated with a computing device 1 where development environment 30 is deployed. It may be appreciated that additional runtime rules 100C may also be generated, or used, depending on specific characterization of proxy server 100.

Proxy server 100 may be configured to identify an execution problem as a condition in which runtime rule 100C has been triggered. Pertaining to the example above, an identified execution problem may be a condition in which an SCE 30B has attempted to store the relevant data element in a prohibited location.

Additionally, proxy server 100 and/or client 200 may be configured to enforce the runtime rules, to mitigate risks to data security, based on the runtime analysis (e.g., based on identification of an execution problem, or trigger of a runtime rule 100C).

Pertaining to the same example, in case that an illegitimate storage command was received, proxy server 100 may be configured to communicate a mitigation action 100G as an alert message 100F (e.g., a revocation alert message 100F) to client 200, which may be configured to perform a mitigation action 100G (e.g., revocation action) in the development environment, based on message 100F, so as to delete the relevant data copies and protect against data exfiltration.

Additionally, or alternatively, and as elaborated herein, system 10 may serve as a virtualization layer, enabling users of development environment 30 to configure, and interface distributed computing environment 50 of various types and configurations.

For example, system 10 may include a development environment integrated library that may facilitate a unified API 100E to access a multitude of types of cloud-based services and/or data elements via proxy server 100. Unified API 100E may be adapted to enable a streamline user definition of computing platforms and clusters, management of cloud-based datasets, and execution of big-data code scripts in a manner that is oblivious to the specific underlying cloud-based environment technology.

Additionally, or alternatively, system 10 may utilize unified API 100E to enable user data access and roles' management, so as to allow access to specific data, and/or run specific data manipulation scripts, while monitoring one or more (e.g., every) incident of data access. Based on this monitoring, system 10 may determine maliciousness of incidents of data access, and optionally block access in case of malicious or unauthorized access is detected, as elaborated herein. Additionally, system 10 may be configured to revoke access and/or automatically delete any data leftovers, such as development environment variables that may be stored or cached in one or more computing devices 1 associated with development environment 30.

Additionally, or alternatively, system 10 may be configured to provide real-time alerts to any predetermined endpoint, such as a predefined email, a text message (e.g., a short messaging service (SMS) message) associated with a specific person, a chat-based service, associated with a specific account, and the like.

For example, system 10 may identify an unauthorized access to a cloud-based element (e.g., a data element stored by a cloud storage service 531 of distributed computing environment 50). Such identification may be based, for example, on (b) automatic detection of an anomalous incident of data access; (b) a rule-based monitoring of data access; (c) revocation (manual or automatic) of a policy, a role, and/or a dataset; (d) expiration of a timeframe for accessing the relevant, specific dataset, and the like. In such embodiments, server 100 may generate an alert notification 100F, and may send notification 100F e.g., as an email message to one or more relevant accounts.

Additionally, or alternatively, notification 100F may include a command, such as a command to perform a mitigation action 100G (e.g., delete a specific data element). Notification 100F may be sent to one or more (e.g., all) clients 200 that are associated with relevant development environments 30. These relevant development environments 30 may be development environments 30 that hold the relevant data, or that are associated with other memory devices, data storage devices, caches, files etc., that were used to save the relevant data. Clients 200 may subsequently proceed to actively delete or purge the relevant data elements as dictated by notification 100F.

Figure 4:
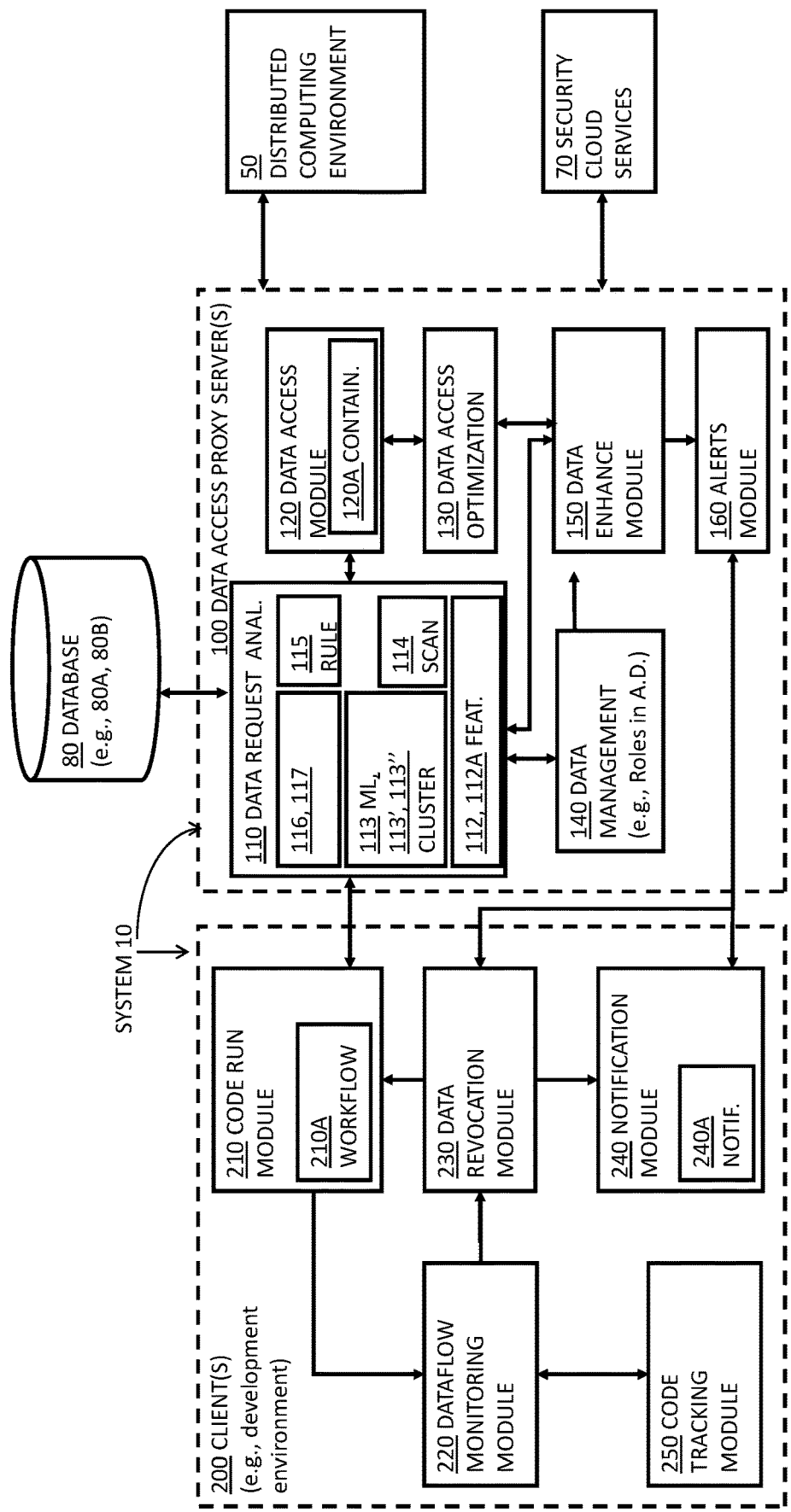
FIG. 4 is a block diagram, depicting a system for providing an interactive development platform in a distributed computing environment, according to some embodiments of the invention.

Reference is now made to FIG. 4, which is a block diagram, depicting another example of a system 10 for providing an interactive development platform in a distributed computing environment 50, according to some embodiments of the invention. It may be appreciated that system 10 of FIG. 4 may be the same as system 10 of FIG. 3. Some elements of FIG. 3 have been omitted in FIG. 4 for the purpose of clarity.

As shown in FIG. 4, at least one client 200 may include a code run module 210, adapted to receive, from a respective development environment 30 one or more ICDs (e.g., notebooks) 30A, each including one or more SCEs (e.g., cells) 30B.

Code run module 210 may be configured to process the received SCEs 30B to extract one or more entities, intended for obtaining a specific data set. Such entities may include, for example, commands, SQL syntax queries, source code elements (e.g., spark or map-reduce code, notebook .pynb files, etc.) and the like. Code run module 210 may be configured to utilize unified API 100E to convert the one or more entities it to a relevant format, and send the converted ICDs (e.g., notebooks) 30A and/or SCEs (e.g., cells) 30B to proxy server 100. Proxy server 100 may in turn communicate the converted notebooks 30A and/or cells 30B to distributed computing environment 50, so as to perform data actions (e.g., data access actions, such as write data into, or delete data from a specific, allowed location on a specific cloud-based service 530).

Additionally, or alternatively, code run module 210 may be configured to produce at least one ICD (e.g., a notebook) 30A that may be referred to herein as a workflow data element 210A (or "workflow" 210A for short). Workflow data element 210A may be, or may include a data structure (e.g., a table) that may associate between execution properties of one or more notebooks 30A and/or cells 30B. In other words, workflow 210A may define a scheme for executing the one or more ICDs 30A and/or SCEs 30B.

For example, workflow data element 210A may define a scheme for executing one or more ICDs 30A in a sense of scheduling of execution of one or more notebooks 30A or cells 30B. Such scheduling may include, for example setting a trigger (e.g., a timestamp, an interrupt, etc.) for executing the one or more notebooks 30A or cells 30B by a cloud computing platform 510 of distributed computing environment 50.

In another example, workflow data element 210A may define a scheme for executing one or more ICDs 30A in a sense of setting an order of execution of one or more notebooks 30A or cells 30B. Such ordering may include, for example setting a first notebook 30A to be executed by a cloud computing platform 510, and setting a second notebook 30A to be executed by cloud computing platform 510 only after execution of the first notebook 30A is completed.

In another example, workflow data element 210A may define a scheme for executing one or more ICDs 30A in a sense of setting a logical condition for executing the one or more notebooks 30A or cells 30B (e.g., execute a first notebooks 30A only if a first condition is met, and execute a second notebooks 30A only if a second condition is met).

In another example, workflow data element 210A may define a scheme for executing one or more ICDs 30A in a sense of setting up a condition of concurrence of execution of two or more notebooks 30A or cells 30B. For example, setting up a plurality of cells to be executed in parallel (e.g., substantially at the same time), e.g., by using a plurality of processors of cloud computing platform 510.

According to some embodiments, workflow data element 210A may be received, e.g., from a user or another computing device (e.g., via input 7 of FIG. 2). Additionally, or alternatively, code run module 210 may receive (e.g., as a script, via a user interface, and the like) one or more parameters defining characteristics or properties of a workflow data element 210A (e.g., ordering of notebook execution, concurrence of execution, condition of concurrence of execution, timing of notebook execution, and the like), and may produce workflow data element 210A so as to define a scheme for executing one or more ICDs 30A, based on the one or more received parameters.

As elaborated herein, code run module 210 may be configured to transmit workflow data element 210A to proxy server 100, which may in turn communicate workflow 210A to distributed computing environment 50, in order to execute the one or more notebooks 30A or cells 30B according to the execution scheme defined by workflow 210A.

According to some embodiments, at least one client 200 may include a dataflow monitoring module 220, configured to extract relevant entities of the received notebooks 30A or cells 30B. Such extracted entities may include, for example variables, file-names, local-database-actions, names, cache-engines and/or cookies used in the development environment that include, or are a copy or an output of a dataset retrieved from distributed computing environment 50. Additionally, the extracted entities may include parameters that are included in cells 30B, that may be utilized to determine legitimacy of data actions (e.g., data access).

According to some embodiments, dataflow monitoring module 220 may be configured to log every code snippet that the dataset name or a copy that was identified as a copy is mentioned in, and send the logs to proxy server 100, while keeping a local encrypted log that may be used by a data revocation module 230, as elaborated herein.

According to some embodiments, at least one client 200 may include a data revocation module 230, adapted to receive an alert or a message (e.g., element 100F of FIG. 3) of revocation from proxy server 100, and get the relevant objects (e.g., variables, file stores, caches) from dataflow monitoring module 220. Data revocation module 230 may subsequently delete the relevant data according to message 100F.

As shown in FIG. 4, at least one client 200 may include a notification module 240. According to some embodiments, data revocation module 230 may be configured to communicate with notification module 240, to notify the results of a revocation to relevant users. Notification module 240 may, in turn be configured to transmit a notification 240A to at least one user regarding occurrence of data revocation, and relevant entities (e.g., variables, files, caches that have been affected). The notification may be transmitted, for example as a text message to an email account or messaging account of one or more relevant users. Additionally, or alternatively, notification module 240 may transmit notification 240A to development environment 30, to be presented to a user.

As shown in FIG. 4, at least one client 200 may include a code tracking module 250, configured to scan source code that is included in one or more ICDs 30A (e.g., notebooks 30A) or SCEs 30B (e.g., cells 30B) of development environment 30. Code tracking module 250 may scan the source code continuously (e.g., periodically, or repeatedly over time). Alternatively, code tracking module 250 may scan the source code by demand, or after every instance of code execution.

According to some embodiments, during scan of the source code, code tracking module 250 may look for specific code executions results, failures or snippets that contain or match a list of terms. This list of terms may, for example be retrieved from proxy server 100 or from a database 80.

According to some embodiments, code tracking module 250 may log each finding in according to a relevant log category. The log categories may include, for example specific instances of source-code execution, specific datasets, specific data risks, and the like.

Additionally, or alternatively, code tracking module 250 may scan the development environment's 30 source code (e.g., source code in ICDs 30A and/or SCEs 30B) to find instances of code that are adapted to attempt to access distributed computing environment 50 while circumventing proxy server 100. Such access attempts may utilize, for example commands, action APIs and import-objects to retrieve data from stored by cloud-based services 530. Code tracking module 250 may log finding of such instances, and may transmit these findings to proxy server 100 in order log, notify and/or block relevant access or optimize a current or a subsequent execution after "learning" the relevant terms and code-snippets.

Additionally, or alternatively, code tracking module 250 may collaborate with data revocation module 230 to delete or purge data footprint of at least one SCE 30B.

For example, code tracking module 250 may record a lineage of at least one data element or data frame of SCE 30B. Such lineage may include, or represent a history of locations and/or links to locations in which at least one version of the at least one data element of SCE 30B was stored or kept.

For example, code tracking module 250 may record copying of a first data frame into a second data frame, renaming (e.g., changing a filename) or reformatting (e.g., changing a file type) of a first data frame into one or more second data frames, inclusion of a first data frame (e.g., a data structure such as a table) in one or more second data frames (in a comma separated vector (CSV) file), uploading or saving the first data frame (e.g., onto a cloud storage service), and the like.

Code tracking module 250 may subsequently be invoked by data revocation module 230 as part of a mitigation action, to delete or purge a footprint of the first data frame or data element. Pertaining to the same example, code tracking module 250 may delete the footprint of the first data frame or data element by deleting, or disabling access to copies and/or versions of the first data frame and/or the one or more second data frames.

Additionally, or alternatively, code tracking module 250 may be configured to perform run-time analysis of execution of one or more SCEs (e.g., cells) 30B of one or more ICDs 30A (e.g., notebooks).

For example, during processing or execution of SCEs (e.g., cells) 30B, code tracking module 250 may continuously communicate with proxy server(s) 100 to monitor output logs produced by computing environment 50, and extract therefrom processing statistics such as processing time (e.g., duration of execution) of SCEs (e.g., cells) 30B. Code tracking module 250 may then analyze the processing statistics, for example by comparing the processing statistics (e.g., execution time) to historical processing statistics of previous executions, as elaborated herein.

As shown in FIG. 4, at least one proxy server 100 may include a data request analysis module 110, adapted to analyze commands and features received from a client's 200 code run module 210. Additionally, data request analysis module 110 may be configured to scan files that may be sent by one or more clients 200 as part of command parameters.

According to some embodiments, data request analysis module 110 may extract one or more features, such as dataset names and terms from the received command, and compare the one or more extracted features to historical similar commands, results and/or processing-periods and/or features associated specific users such as roles, policies, countries, Internet Protocol (IP) addresses and the like. Based on this comparison, data request analysis module 110 may check for abnormal behavior.

For example, data request analysis module 110 may receive (e.g., from input 7 of FIG. 2) set of predetermined scripting rules 100D and/or runtime rules 100C. Additionally, or alternatively, and as elaborated herein, data request analysis module 110 may automatically generate a set of scripting rules 100D and/or runtime rules 100C using a machine-learning (ML) model 113 based on data from a data enhancement module 150 and historical logs.

According to some embodiments, during preemptive scan of an ICD 30A (e.g., a notebook), client 200 may upload ICD 30A to proxy server 100 to be scanned. Proxy server 100 may analyze the received ICD 30A code elements 30B in view of a repository or database 80 of suspicious or malicious actions (denoted in FIG. 4 as database 80). In some embodiments, repository 80 may include a static repository 80A, that may include or store one or more definitions of actions that are identified as suspicious or malicious (e.g., from third-party databases or online data sources (e.g., GitHub)).

Additionally, or alternatively, database 80 may include a dynamic repository 80B, that may store, or include definitions of actions that are classified as suspicious or malicious by ML model 113, in a continuous effort to identify such actions or code lines in SCEs 30B. In some embodiments, ML model 113 may be configured to learn a pattern of history of actions of specific users and/or groups of users, as represented by code lines or CSEs 30B (e.g., cells) in notebooks 30A, to identify anomalous actions, and mitigate potential threats derived from such actions.

According to some embodiments, ML model 113 may be configured to accumulate a subset of SCEs 30B, each representing one or more data actions. The one or more data actions may include, for example actions of accessing data that is stored on the at least one cloud-based platform 50, actions of importing software modules, actions of running or executing specific commands or sets of commands, and the like. ML model 113 may, in turn, classify the subset of scripting code elements (e.g., in relation to at least one client module 200), to one or more data action classifications or categories.

For example, if a specific type of SCE 30B, representing a data access action is frequently (e.g., beyond a predefined threshold) performed by a specific user via a specific client 200, then ML model 113 may be configured to classify the specific type of SCE 30B as a legitimate action for that user and/or client 200 (e.g., the corresponding action classification may be "legitimate data access").

In a complementary manner, if a specific type of SCE 30B is not frequently (e.g., below a predefined threshold) performed by a specific user via a specific client 200, then ML model 113 may be configured to classify the specific type of SCE 30B as an illegitimate action for that user and/or client 200. (e.g., the corresponding action classification may be "illegitimate data access").

It may be appreciated that other data action classifications are also possible, according to specific types of corresponding data actions.

Based on this classification, ML model 113 may determine at least one scripting rule 100D or metadata rule 100D', that may associate the relevant SCE 30B or action with a specific mitigation action or message 100F.

Additionally, or alternatively, data request analysis module 110 may include a feature extraction module 112, configured to extract one or more action features 112A from at least one specific SCE 30B. The one or more features 112A may include, for example features of data access actions, representing patterns of accessing data on a distributed computing platform 50. Feature extraction module 112 may introduce the one or more extracted features 112A to ML model 113, which may classify the specific SCE 30B according to one or more action classifications (e.g., data access action classifications), based on the one or more features 112A (e.g., the data action features 112A).

For example, data action features 112A may include data access features such as a frequency of accessing data by one or more specific users, historical success, or failure of accessing data by the specific users, latency of data retrieval and the like. During a training period, ML model 113 may receive data action features 112A (e.g., data access features 112A) pertaining to a plurality of SCEs 30B, and may be trained to predict or classify corresponding CSEs as including legitimate actions (e.g., legitimate data access requests) or illegitimate actions (e.g., illegitimate data access requests). In a subsequent inference stage, ML model 113 may receive action features 112A (e.g., data access features 112A) pertaining to a specific target SCE 30B, and classify the target SCE 30B as including legitimate or illegitimate actions (e.g., legitimate, or illegitimate data access requests), according to the one or more action features 112A (e.g., data access features 112A) based on the training.

In other words, proxy server 100 may be configured to verify, during run-time or just preceding run-time, at least one of (a) permission-based legitimacy of data retrieval by the at least one scanned SCE 30B, and (b) lack of malicious activity in the at least one scanned SCE 30B.

Additionally, or alternatively, ML model 113 may produce a confidence score, representing pertinence of one or more SCEs 30B to the one or more classifications. For example, ML model 113 may provide a confidence score representing the extent of which a specific SCE 30B pertains to a specific action classification (e.g., legitimate, or illegitimate data access requests). Data request analysis module 110 may subsequently determine at least one scripting rule 100D based on the confidence score. For example, if an action represented by SCE 30B is classified by ML model 113 as illegitimate with a high (e.g., beyond a predefined threshold) confidence score, then scripting rule 100D may associate the SCE 30B with a first (strong) mitigation action 100G, such as denial of execution and/or revoking of data. In a complementary manner, if an action represented by SCE 30B is classified by ML model 113 as illegitimate with a low (e.g., below a predefined threshold) confidence score, then scripting rule 100D may associate the SCE 30B with a second (weak) mitigation action 100G, such as sending a notification 100F to an administrator's email.

Additionally, or alternatively, ML model 113 may cluster SCEs 30B (or command lines, included in SCEs 30B) based on previously received SCEs 30B, and/or SCEs 30B that are already included in database or repository 80. In some embodiments, ML model 113 may cluster SCEs 30B into one or more clusters (denoted 113') to form a clustering model (also denoted 113'), and then classify one or more incoming target SCE 30B as legitimate, or illegitimate based on the clustering model 113'. The terms "clusters" and "cluster model" may be used interchangeably in this context.

According to some embodiments, data request analysis module 110 may calculate a similarity score, or similarity metric value 117 for one or more code lines of the SCEs 30B to corresponding code lines in repository 80. For example, a first code line of a first SCE 30B such as "%run-t mynb.ipynb" may have high similarity (e.g., a high similarity metric value 117) to a second code line such "% run" that may be stored in repository 80 as a legitimate code line. Data request analysis 110 may apply a similarity threshold to associate these two code lines in the same cluster 113' of the clustering model 113', and may subsequently classify the code line "%run-t mynb.ipynb" as legitimate, based on this clustering 113'.

Additionally, or alternatively, data request analysis 110 may be configured to cluster SCEs 30B into clusters 113' that include, or pertain to similar actions. Such actions may include, for example importing of modules, "pandas" data frame actions, special notebook actions implemented in notebook kernels (commonly referred to as "magic" actions), data retrieval actions and the like.

For example, data request analysis 110 may calculate a frequency metric value, representing a frequency of appearance of terms or keywords in code lines of SCE 30B. Additionally, or alternatively, data request analysis 110 may calculate a similarity metric value 117, representing similarity between two or more of the terms or keywords of SCE 30B. ML model 113 may subsequently cluster the terms or keywords based on the calculated frequency metric value and/or the similarity metric value 117 to produce a cluster model (denoted 113'), that may be or may include a plurality of clusters (also denoted 113'). Each cluster 113' of cluster model 113' may represent terms that are close in meaning and/or utilization.

Additionally, or alternatively, for one or more (e.g., each) cluster 113' of cluster model 113', data request analysis 110 may calculate or generate sub clusters (denoted 113"), to indicate finer accuracy granularity of similar actions, using a similarity algorithm. For example, a cluster 113' of import actions may include a first sub-cluster 113" that pertains to importing "pandas" elements, and a second sub-cluster 113" that pertains to importing "JSON" elements.

Additionally, or alternatively, for one or more (e.g., each) cluster 113' and/or sub-cluster 113", data request analysis 110 may calculate a ranking score 116, representing legitimacy of code lines or SCEs 30B included in that cluster 113' or sub-cluster 113".

For example, data request analysis 110 may calculate the ranking score 116 as a function of a frequency (e.g., the number of times) that a relevant SCE 30B (which may also be referred to herein as a "code line", "term", or "cell") appears in a repository of client 200 and/or in third-party, online repositories.

Additionally, or alternatively, the ranking score 116 may be calculated as a function of the time (e.g., days) that has elapsed since a previous appearance of an SCE 30B of the same cluster 113' in the scanned notebooks 30A.

For example, a ranking score 116 (denoted RankScore(i)) of a specific SCE 30B (denoted T) may be calculated according to equation Eq. 1, below:

$$RankScore(i) = \frac{(TotalTermFreq(i) \times ActionTime(i))}{\text{Max}_{all\ clusters}[AllTerms(\text{cluster})] \times \text{Max}_{0 \leq i \leq R}[ActionTime(i)]} \times \left[\frac{1}{\log(dDays(i)+1)}\right] \quad \text{Eq. 1}$$

Where TotalTermFreq(i) may be the number of times that a specific term or sub-term "e.g.: import pandas" was found (e.g., counted) in the customer historical notebooks 30A or code-scripts;
ActionTime(i) may be the time (e.g., in seconds) that the action took to perform (e.g., for code actions);
$\text{Max}_{all\ clusters}$ [AllTerms(cluster)] may be the maximum amount of time that a term or a sub-term was found (e.g., counted) for this specific notebook 30A in historical runs (e.g., all historically recorded executions);
$\text{Max}_{0 \leq i \leq R}$ [ActionTime(i)] may be the maximum amount of time (e.g., in seconds) that a term or sub-term took for this specific notebook 30A in historical runs (e.g., all historically recorded executions); and
log (dDays(i)+1) is a logarithm on the number of (days+1), that have elapsed since this specific notebook 30A (that had this term or sub-term 'i' ran until the present time.

According to some embodiments, data request analysis module 110 may produce one or more run-time rules 100C and/or one or more scripting rules 100D, based on the clustering 113'. Run-time rules 100C and/or scripting rules 100D may be stored in repository 80, and may be used for continuous preemptive, and run-time analysis of ICDs 30A and SCEs 30B.

For example, as elaborated herein, ML model 113 may classify or define a cluster 113' of actions as representing illegitimate actions (e.g., actions that include transferring of data to an untrusted location). Data request analysis module 110 may create a scripting rule 100D, and associate scripting rule 100D with the relevant cluster 113'. Scripting rule 100D may be regarded as a rule in a sense that it may associate an identified condition (e.g., appearance of an illegitimate data transferal action), as defined by the relevant cluster 113', with a mitigating action. In this example, mitigating action may include disallowing of execution of the illegitimate actions that are included in the relevant cluster 113'.

According to some embodiments, data request analysis module 110 may be, or may include a monitoring module, adapted to monitor execution of SCEs 30B of the one or more ICDs 30A by the at least one cloud-based platform 50.

Additionally, or alternatively, data request analysis module 110 may include a rule engine module 115, adapted to identify, during run-time or subsequent to execution, a problem in execution of SCE 30B, according to a set of predefined runtime rules 100C, based on the monitoring.

For example, data request analysis module 110 may perform run-time monitoring of logs generated by the at least one cloud-based platform. In another example, data request analysis module 110 may perform run-time monitoring of an order of execution of the scripting code elements. In another example, data request analysis module 110 may perform run-time monitoring of output of the executed scripting code elements. In another example, data request analysis module 110 may monitor execution statistics such as duration of execution of at least one scripting code element of the one or more interactive computing documents.

In another example, data request analysis module 110 may perform a comparison between output statistics of a current execution of an interactive computing document and output statistics of a previous execution of the interactive computing document.

For example, data request analysis module 110 may be configured to identify at least one difference between an output of a specific SCE 30B at a first execution and an output of the specific SCE 30A (e.g., the same SCE 30B, or another SCE 30B containing similar code lines) at a second execution.

In another example, data request analysis module 110 may be configured to identify at least one difference between a first metadata element (e.g., duration of execution, memory footprint, power consumption, etc.), associated with a specific scripting code element at a first execution, and a second, corresponding metadata element, associated with the specific scripting code element at a second execution.

Additionally, or alternatively, during run-time, data request analysis module 110 may monitor run-time statistics and/or output of executed ICDs (cells) 30A. For example, data request analysis module 110 may record the processing time each cells, such as code cells, markup (HTML) cells, and/or raw cells, as commonly referred to in the art. Rule engine module 115 of Data request analysis module 110 may produce one or more run-time rules 100C pertaining to specific features or characteristics of the execution statistics and/or output of the execution. Pertaining to the same example, rule engine module 115 may produce a rule 110C that associates between a detected abnormal behaviour (e.g., when execution exceeds a predetermined threshold period) and a mitigation action (e.g., revocation of data).

Data request analysis module 110 may analyze the one or more extracted action features to identify a suspicious or abnormal actions, such as an abnormal attempt to access data stored on computing environment 50. In a condition that such an abnormal or suspicious data action request 200B is identified, analysis module 110 may block the relevant data action request 200B (e.g., from accessing, reading, writing, deleting, etc. relevant data on computing environment 50).

Additionally, or alternatively, data request analysis module 110 may produce a message or log that includes an indication of the identified abnormal data action (e.g., abnormal data access). Data request analysis module 110 may transmit this message to be stored on database 80. Additionally, or alternatively, data request analysis module 110 may communicate the message or log of abnormal behavior to an alerts' module 160.

Alerts module 160 may in turn send a notification (e.g., an email message) to relevant computing systems e.g., via notification module 240 of the relevant client 200. Additionally, or alternatively alerts module 160 may communicate the notification of abnormal data action to data revocation module 230 of the relevant client 200, to revoke or delete the relevant data from storage associated with the relevant development environment 30.

Additionally, or alternatively, rule engine module 115 may collaborate with alerts module 160 to communicate a notification message 100F to a relevant client module 200. Message 100F may include a representation of the identified execution problem (e.g., rule 100C that has been triggered).

Client 200 may subsequently display notification message 100F on a user interface (UI) of the user development platform 30.

According to some embodiments, data request analysis module 110 may include a scanning service 114. Scanning service 114 may interact with, and scan real-time, incoming SCEs 30B (e.g., data requests) from clients 200, as well as historical requests, and logs of data access footprints and data actions stored on database 80.

Additionally, or alternatively, rule engine module 115 may initiate or perform at least one mitigation action 100G (e.g., other than producing a notification message 100F). For example, rule engine module 115 may communicate with a relevant client 200 and/or cloud-based platform 50, to block a user of the specific client module from performing a data action (e.g., accessing data stored on the at least one cloud-based platform 50). In another example, rule engine module 115 may collaborate with data management module 140, and communicate with one or more organizational servers or databases 80, to change access permissions (e.g., permissions associated with a role of a user, permissions associated with a specific client module, etc.) to a specific cloud-based platform 50. In another example, rule engine module 115 may collaborate with tracking module 250 of a relevant client 200, to delete data footprints of the at least one executed scripting code element, as elaborated herein. In another example, rule engine module 115 may communicate with a relevant client 200 to disable a specific user of a specific client module 200 from executing SCEs 30B in their user development platform 30. Additional mitigation actions 100G are also possible.

As elaborated herein, data request analysis module 110 of proxy server 100 may be adapted to monitor execution of the SCEs 30B of the one or more ICDs 30A by the at least one cloud-based platform 50. Additionally, or alternatively, data request analysis module 110 may be configured to produce a log data element, representing said monitored execution of the scripting code elements. Data request analysis module 110 may communicate the log data element to a relevant client module 200 (e.g., as a notification message 100F). Data request analysis module 110 may communicate the log data element in real-time or near real time so as to facilitate the interactivity quality of ICD 30A, during the development process. The relevant client module 200 may, in turn display log data element (e.g., notification message 100F) on a UI of the user development platform 30.

It may be appreciated that proxy server 100 of the present invention may allow real-time, cell-level logging and monitoring of execution of actions on a cloud-based platform 50, as they are incrementally called in a development platform 30 on the client 200 side.

According to some embodiments, an ICD 30A (e.g., a notebook) may be requested by a user (e.g., by development environment 30) to be executed or scheduled for execution on distributed computing environment (e.g., cloud platform) 50. Client 200 may subsequently upload or transmit ICD 30A to proxy server, either entirely (e.g., including all SCEs 30B of ICD 30A), or partially (e.g., including a subset of SCEs 30B of ICD 30A), according to a predefined configuration. During a preemptive scan, scanning service 114 may be configured to scan the received SCEs 30B (e.g., code lines), according to the set of predetermined scripting rules 100D as elaborated herein (e.g., in relation to FIG. 3).

Additionally, or alternatively, scanning service 114 may be configured to scan a subset of the received SCEs 30B (e.g., code lines), according to a predetermined configuration.

Additionally, or alternatively, the one or more ICDs 30A may include, or be associated with document metadata, such as size (e.g., in Bytes) of the ICD 30A, a type of cells ICD 30B in the ICD 30A (e.g., code cells, markup cells, raw cells, as commonly referred to in the art), an identification of an owner of the ICD 30A, an identification and/or associated permissions of a user who is currently requesting execution of the ICD 30A, etc. Scanning service 114 of proxy server 100 may scan ICD 30A scan the document metadata according to a set of predetermined scripting rules 100D, which may be referred to herein as metadata rules 100D', in this context. Such scripting rules 100D (e.g., metadata rules 100D') may include limitations to metadata of the scanned ICD 30A, such as a limitation of size of the executed ICD 30A, a limitation of permission to execute ICD 30A, a limitation of execution of specific actions of code lines and/or types of CSEs 30B, and the like. Other limitations may also be possible. As elaborated herein, proxy server 100 may then encapsulate the one or more ICDs 30A and/or the workflow data element 210A in one or more data containers 120A, based on the scan of document metadata, e.g., conditioned that ICD 30A metadata successfully complies to the limitations of scripting rules 100D (e.g., metadata rules 100D').

Additionally, or alternatively, during a run-time scan, scanning service 114 may be configured to monitor execution of one or more SCEs 30B in the received ICD 30A, to identify SCE-level (e.g., cell-level) exceptions in the execution of the received ICD (e.g., notebook) 30A, and/or malicious or suspicious actions, according to runtime rules 100C, as elaborated herein (e.g., in relation to FIG. 3). As elaborated herein, scanning service 114 may communicate with code tracking module 250 during run time, to notify a user and/or perform mitigation actions, in response to the identified exceptions or suspicious actions.

As elaborated herein, one or more (e.g., each) problematic code line or action found by rules 100D and/or 100C may be associated with a mitigation action. The mitigation action may be invoked by alert message 100F, and may include, for example sending an email to an administrator user, returning a report to the user interactive development environment 30 using client 200, deleting specific data footprints, disabling execution of code lines in the interactive development environment 30 (either permanently or for a predefined period of time), and the like.

According to some embodiments, proxy server 100 may include a data management module 140. Data management module 140 may be configured to manage permissions, restrictions and/or mitigation actions according to specific users and/or roles.

For example, data management module 140 may be configured to set, or change a mitigation action according to a user's identity. For example, data management module 140 may enable proxy server 100, subject to relevant permissions, to disallow execution of a suspected SCE 30B by a first user, and allow execution of the suspected SCE 30B by a second user, having elevated permissions.

In another example, data management module 140 may allow dynamic adjustment of mitigation actions. For example, data management module 140 may enable proxy server 100 to run a specific ICD 30A (e.g., a notebook) if less that a predefined number of problematic actions (or action with low severity) have been identified in the relevant ICD 30A.

Additionally, or alternatively, a user of development environment 30 may utilize client 200 APIs to request manual analysis/scan of an IC D30A (e.g., notebook), using these modules to get a personal report.

Additionally, or alternatively, scanning service 114 may be configured to add web features that are extracted by data enhancement module 150, to determine or identify a data action (e.g., a data access) request 200B that is suspected to be a security breach. Scanning service 114 may implement anomaly detection and user behavior analysis to determine a risk and send messages on such cases to data access module 120, as elaborated herein.

According to some embodiments, scanning service 114 may be configured to check data validation in case of data actions such as a data write access or a data delete access, to avoid a malicious of erroneous changes in a dataset stored on environment 50.

For example, scanning service 114 may determine that a delete data access is valid by comparing, or analyzing extracted features (e.g., timestamps, dataset names, execution-code, etc.) of a current data action request 200B in view of extracted features of historical delete data access sequences. Scanning service 114 may compare such extracted features of a predefined number of actions before and/or after deletion, corresponding to current and historical delete data action requests 200B, to identify an anomalous deletion attempt.

In a similar example, scanning service 114 may determine validity of a write/replace" by identifying a suspicious or anomalous write data access attempt by comparing extracted features such as column names or the new and old datasets and the value distribution and range per column or new and old datasets and determine whether to block the action and/or notify users.

As shown in FIG. 4, at least one proxy server 100 may include a data access module 120, adapted to receive one or more ICDs 30A and/or at least one workflow data element 210A from a client 200, and encapsulate the workflow data element and the one or more ICDs 30A in one or more data containers 120A, based on the preemptive scan (e.g., conditioned that the preemptive scan was successful).

In other words, if a preemptive scan of an ICD (e.g., notebook) 30A is successful, in the sense that data request analysis module 110 did not identify the one or more notebooks 30A (and/or data action requests 200B included in the one or more notebooks 30A) as being suspicious or abnormal, then data access module 120 may encapsulate the relevant one or more notebooks 30A in a data container 120A. If, on the other hand, a preemptive scan of at least one notebook 30A fails, in the sense that data request analysis module 110 did identify the at least one notebook 30A as suspicious or abnormal, then data access module 120 may refrain from encapsulating the relevant one or more notebooks 30A in a data container 120A, and thus block any data action request 200B included in the one or more notebooks 30A.

Additionally, or alternatively, data request analysis module 110 may block execution of one or more ICDs 30A (e.g., notebooks) based on outcome of the preemptive scan, by disallowing transmission of ICDs 30A (e.g., whether encapsulated in data container 120A or not) to cloud computing platform 510.

As known in the art, the term "container" (also commonly referred to as a "docker") may be used herein to refer to a standard unit or package of software that may include computer code (e.g., source code included in cells 30B) and relevant code dependencies required for execution of that computer code. Such dependencies may include, for example references to specific resources, (e.g., specific elements of distributed computing environment 50), databases, (e.g., database 80), configuration of distributed processing systems (e.g., kernels, and memory of distributed processing systems 520), configuration of cloud services (e.g., allocated storage in storage services 531), and the like.

It may be appreciated that such encapsulation of source code (e.g., source code included in cells 30B) into a container or docket 120A may allow an application to be quickly and reliably executed, from one computing environment to another (e.g., from development environment 30 to distributed computing environment 50).

Additionally, or alternatively, data access module 120 may receive (e.g., from a user of development environment 30, via client 200) one or more configurations or adjustments to container 120A (e.g., selection of processing units, selection of memory, etc.), and may adapt container 120A accordingly.

For example, as known in the art, execution parameters may be used in computing languages to allow a user to provide arbitrary configuration information and/or setting variable values for executing computer code. According to some embodiments, data access module 120 may receive from the at least one client module, at least one execution parameter value, associated with a specific ICD 30A, and may inject the received execution parameter value as metadata into the relevant ICD 30A. Data access module 120 may then encapsulate the document metadata (e.g., including the injected execution parameter value) into the one or more data containers 120A. Data access module 120 may subsequently transmit, or propagate (e.g., via the Internet) data containers 120A to the at least one cloud-based platform 50, which may, in turn execute at least one SCE 30B of the one or more ICDs according to the document metadata (e.g., according to the injected execution parameter value).

According to some embodiments, data access module 120 may be configured to transmit the one or more data containers 120A to at least one cloud-based platform (e.g., distributed computing environment 50), to execute the one or more ICDs 30A.

Additionally, or alternatively, data access module 120 may be configured to transmit the one or more data containers and/or the workflow data element to the at least one cloud-based platforms, to execute the one or more interactive computing documents according to the execution scheme.

As elaborated herein, at least one cloud computing platform 510 of distributed computing environment 50 may be configured to execute, or run the one or more ICDs 30A encapsulated in data containers 120A according to the execution scheme defined by the workflow data element 210A as elaborated herein (e.g., in relation to FIG. 3).

According to some embodiments, proxy server may be configured to encapsulate workflow data element 210A with the one or more ICDs 30A in the one or more data containers 120A. Additionally, or alternatively, proxy server may be configured to transmit workflow data element 210A separately from the one or more data containers 120A of ICDs 30A (e.g., as separate data files) to cloud computing platform 510 of distributed computing environment 50.

According to some embodiments, data access module 120 may be configured to encapsulate workflow data element 210A separately from the one or more ICDs 30A. For example, data access module 120 may encapsulate workflow data element 210A in a first data container 120A, and then spawn or generate one or more second data containers 120A from the first data container 120A. The second data containers 120A may be characterized by that (a) each second data containers 120A may inherit configurations and/or definitions of the first data container 120A, and (b) one or more (e.g., each) container 120A of the second data containers 120A may encapsulate one or more ICDs 30A of the one or more received ICDs 30A, based on the workflow data element. In other words, the spawning of the one or more second data containers 120A may manifest the execution scheme (e.g., order of execution, dependency of execution, parallelism of execution) of the relevant ICDs 30A.

Data access module 120 may then transmit the one or more second data containers 120A to the at least one cloud-based platform 50 according to the execution scheme, as defined by the workflow data element 210A. Additionally, or alternatively, the at least one cloud-based platform 50 may be configured to execute the one or more relevant ICDs 30A, encapsulated in their respective containers 120A, according to the execution scheme, as defined by the workflow data element 210A.

As shown in FIG. 4, at least one proxy server 100 may include a data enhancement module 150. According to some embodiments, data enhancement module 150 may be, or may include a data mining engine, adapted to extract data from various data sources and databases, including for example online data sources, local and/or cloud based databases, and/or rules and terms that are added manually (e.g., via input 7 of FIG. 2).

According to some embodiments, data enhancement module 150 may mine for data such as machine details per cloud provider/platform/solutions, and its cost, machine-learning and data processing code snippets from code repositories (e.g. Github/Blogs/StackOverflow.com). Data enhancement module 150 may provide the mined data to a data access optimization module 130 to predict the best offer to process/retrieve/write data, as elaborated herein.

Additionally, or alternatively, data enhancement module 150 may also extract or mine relevant data for the data request analysis module 110 for the prediction of a security risk or mistake.

According to some embodiments, data enhancement module 150 may, as part of the data mining process, query security engines/tools/Apis/knowledgebases (e.g. exploitation/vulnerability databases, https://attack.mitre.org/, DarkReading website, open source list of security detection rules) as well as code repositories and blogs on specific data breach cases (e.g. in https://stackoverflow.com/, https://github.com/) and cloud platform documentations of data retrieval/processing/write to get a reference for valid code snippets. Data enhancement module 150 may then aggregate the mined data to a relevant list of bad/good terms for recommendations for the data request analysis module 110 to determine/predict a security/data-breach/data-exfiltration issue. Data enhancement module 150 may also build a set of recommendations per historical detected potential data breach/exfiltration using the extracted data and log of actions.

As shown in FIG. 4, at least one proxy server 100 may include a data management module 140, configured to enable addition, updating and/or deletion of entities such as users, roles, policies, security-rules, recommendations, data-services, clusters, schedulers, code-scripts (on every cloud platform) and datasets and dataset actions, while managing connection to customer users-databases such as Lightweight Directory Access Protocol (LDAP), Active Directory (AD), Gsuite and the like. Data management module may include a configuration required to connect to all users, cloud providers, data services, and data sets in order to send commands and retrieve/delete/write data from/to environment 50.

Additionally, or alternatively, data management module 140 may enable a user (e.g., via input 7 of FIG. 2) to define an automatic processing machine/machines-cluster/job/notebook/scripts scheduler, that will interact with the data access optimization module 130, as elaborated herein.

Retrieval of data is being done by analyze the command(s) and compare it to all the historical commands that were sent during a cluster connection session to determine if there is a need to send the request again or simply retrieve the last result, that was already cached on a cloud storage, while verifying the timestamp of the result to user parameters or force-retrieve parameter.

According to some embodiments, data access optimization module 130 may be configured to further analyze the data request or execution request that was analyzed by data request analysis module 110. In some embodiments, data access optimization module 130 may split a received data action request 200B to terms such as actions, codes, file-parameters and the like. Data access optimization module 130 may analyze these terms in comparison to, or in view of similar historical terms (e.g., terms included in previous data action requests 200B). Such similarity (e.g., similarity metric value 117) may be calculated, for example by algorithms such as Term Frequency-Inverse Document Frequency (TF-IDF), cosine similarity, ML-based models, and the like. According to some embodiments, based on this analysis or comparison, data access optimization module 130 may determine whether to retrieve the last action's results (e.g., operate as a cache) or to re-process it.

Additionally, or alternatively, access optimization module 130 may calculate (e.g., via a regression model) the amount of data requested in case of retrieve data (or simply data size in case of write/delete) and determine, using a prediction model calculate beforehand (e.g., running every predetermined interval) the cheapest and/or fastest code or API and platform or solution to run the action, choosing the best options automatically by user definitions in data management module 140 (automatic/manual changes to the auto process), while deciding to create new data-cluster(s) or alter the cluster machine types or number of machines (might be on various cloud providers) to process the data and/or terminate/halt current active clusters/services on different cloud platforms/services, by calculating the optimal time for the cluster to work before termination and the size of the initial cluster on creation.

Additionally, or alternatively, access optimization module 130 may calculate a computing machine type and/or a required number computing machines by employing a machine learning model and statistics regressions by extracting relevant terms from the action's parameters (can be a code snippet or code file or notebook file) and gathering the relevant parameters logged from the client 200 code run module 210 (such as: 'CUDA', 'GPU', 'TensorFlow', 'Keras', "Memory failure") and historical actions results and processing time.

Figure 5:
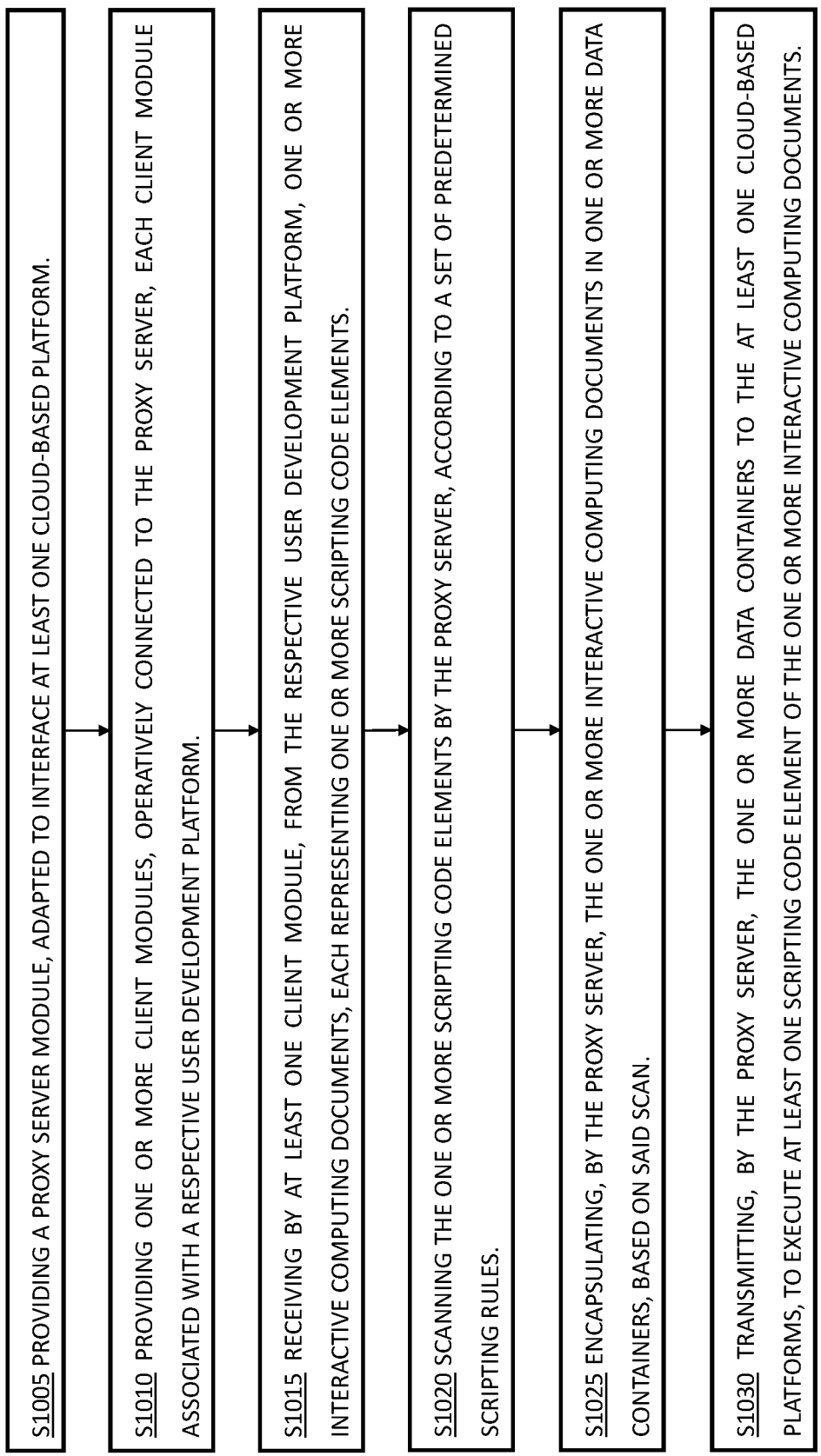
FIG. 5 is a flow diagram, depicting a method of providing an interactive development platform in a distributed computing environment, by at least one processor, according to some embodiments of the invention.

Reference is now made to FIG. 5, which is a flow diagram, depicting a method of providing an interactive development platform in a distributed computing environment 50, according to some embodiments of the invention.

As shown in steps S1005 and S1010, embodiments of the invention may provide a proxy server module (e.g., proxy server 100 of FIG. 4), adapted to interface at least one cloud-based platform (e.g., distributed computing environment 50 of FIG. 4), and one or more client modules (e.g., client(s) 200 of FIG. 4), operatively connected to proxy server 100, where each client module 200 is associated with a respective user development platform (e.g., development environment 30 of FIG. 3) such as Amazon's Sagemaker.

As shown in step S1015, at least one client module 200 may receive, from the respective user development platform 30, one or more ICDs 30A. ICDs 30A are also referred to herein as notebooks, such as Amazon Sagemaker notebook documents. The terms ICD and notebook may be used herein interchangeably. As known in the art, each ICD or notebook 30A may include, or represent one or more SCEs 30B, such as notebook cells, as commonly referred to in the art. The terms SCE, cells and code lines may be used herein interchangeably.

Additionally, or alternatively, the at least one client module 200 may produce a workflow data element (e.g., element 210A of FIG. 4), that may define a scheme for executing the one or more ICDs, as elaborated herein (e.g., in relation to FIG. 4).

According to some embodiments, the at least one client module 200 may transmit (e.g., via the Internet) the one or more ICDs 30A and/or the one or more included SCEs 30B and/or the workflow data element 210A to proxy server 100. As shown in step S1020, proxy server 100 may scan the one or more SCEs elements 30B according to a set of rules. For example, proxy server 100 may perform a preemptive scan of the one or more SCEs 30B according to a set of predetermined scripting rules 100D (e.g., element 100D of FIG. 3), as elaborated herein (e.g., in relation to FIG. 4).

As shown in step S1025, proxy server 100 may encapsulate the one or more interactive computing documents in one or more data containers (e.g., element 120A of FIG. 4), based on the scan (e.g., provided that the scan was successful) as elaborated herein (e.g., in relation to FIG. 4). Additionally, or alternatively, proxy server 100 may encapsulate workflow data element 210A with the one or more interactive computing documents in the one or more data containers 120A.

As shown in step S1030, proxy server 100 may subsequently transmit the one or more data containers to the at least one cloud-based platforms 50. Cloud-based platform 50 may be configured to execute at least one SCE 30B of the one or more ICDs 30A encapsulated in the one or more containers 120A. Additionally, or alternatively, proxy server 100 may transmit the one or more data containers to the at least one cloud-based platforms, to execute the at least one SCE 30B of the one or more notebooks, according to the execution scheme, as defined by the workflow data element 210A.

As elaborated herein, embodiments of the invention may include a practical application for improving the technology of a computing system.

For example, as explained herein (e.g., in relation to FIG. 1), proxy server 100 and the one or more client computing devices 200 may be configured to streamline a development process that currently requires iterative collaboration between a plurality of disciplines and stakeholders such as research engineers, data scientists, data engineers and automation engineers.

Additionally, embodiments of the invention may provide this streamlined workflow in a manner that maintains data security, and requires optimal computation resources.

For example, embodiments of the invention may enable following datasets that are transferred to a development environment and revoke or limit their use, while understanding source code and variables.

In another example, embodiments of the invention may track transfer of data requests 200B between client 200 and proxy server 100 locally/remotely and learn malicious data behaviors, that may use the retrieved data and transfer/save/write/replace/process it, in order to delete data footprints in case of a data security incident (either by a malicious user or by mistake). Additionally, embodiments of the invention may employ rules, statistics and ML models to alert on a problematic or suspicious data-related behavior and block suspicious data-related actions.

In another example, embodiments of the invention may provide a multiple notebook development environment, that may facilitate integration of notebooks in a workflow, to follow and understand data access behavior and usage, while enabling scheduled tasks to be monitored and optimizes execution of data/machine-learning relevant commands/jobs/scripts.

In another example, embodiments of the invention may optimize data action requests 200B (e.g., data access requests) by analyzing the requests 200B and determining the amount of data requested and activating the optimal request for the optimal service and choosing the optimal machine type(s) and number, in terms of cost and speed, in order to get/write/delete the data or run the data related source code in the fastest and/or cheapest combination, that may require to automatically create new bigdata cluster or terminate other clusters on different cloud platforms, to get the data in a scalable manner by manually/automatically defining the number of data-nodes (size of cluster) according to the request and the optimal active time for each cluster on each cloud platform for optimal processing.

In another example, embodiments of the invention may provide recommendations on how to improve performance or harden data security by extracting relevant web related knowledge base and code snippets after identifying potential data exfiltration, while accessing all data sources and use various data services and data related actions and using development environment to investigate data.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A proxy server for providing an interactive development environment, said proxy server configured to:
   operatively connect to one or more client modules, each associated with a respective user development platform;
   receive, from at least one client module of the one or more client modules, one or more interactive computing documents, each comprising one or more scripting code elements;
   scan the one or more scripting code elements according to a set of predetermined scripting rules;

encapsulate the one or more interactive computing documents in one or more data containers, based on said scan; and transmit the one or more data containers to at least one cloud-based platform, to execute at least one scripting code element of the one or more interactive computing documents;

the proxy server further configured to:

accumulate a subset of scripting code elements, each representing one or more data actions;

classify the subset of scripting code elements, in relation to the at least one client module, to one or more classifications; and determine at least one scripting rule based on the one or more classifications; or obtain, from a machine learning (ML) based model, a confidence score, representing pertinence of the one or more scripting code elements to the one or more classifications; and determine the at least one scripting rule based on the confidence score.

2. The proxy server of claim 1, wherein the proxy server is further configured to:

receive, from the at least one client module, a workflow data element, defining a scheme for executing the one or more interactive computing documents;

encapsulate the workflow data element with the one or more interactive computing documents in the one or more data containers; and transmit the one or more data containers to the at least one cloud-based platform, to execute the at least one scripting code element of the one or more interactive computing documents according to the scheme, as defined by the workflow data element.

3. The proxy server of claim 2, wherein the scheme for executing the one or more interactive computing documents comprises at least one of: (a) scheduling of execution of the one or more interactive computing documents; (b) an order of execution of the one or more interactive computing documents; (c) a condition for executing the one or more interactive computing documents; and (d) concurrence of execution of two or more interactive computing documents.

4. The proxy server of claim 2, wherein the one or more interactive computing documents further comprise document metadata, and wherein the proxy server is further configured to:

scan the document metadata according to a set of predetermined metadata rules; and encapsulate the workflow data element and the one or more interactive computing documents in the one or more data containers, based on said scan of the document metadata.

5. The proxy server of claim 1 further configured to:

receive, from the at least one client module, at least one execution parameter value, associated with a specific interactive computing document;

inject the received execution parameter value as metadata into the relevant specific interactive computing document; and further encapsulate document metadata in the one or more data containers, wherein the at least one cloud-based platform is further configured to execute the at least one scripting code element of the one or more interactive computing documents according to the document metadata.

6. The proxy server of claim 5 further comprising:

a feature extraction module, configured to extract one or more data action features from at least one specific scripting code element of the subset of scripting code elements; and the ML based model configured to classify the specific scripting code element according to the one or more classifications, based on the one or more data action features.

7. The proxy server of claim 2 configured to encapsulate the workflow data element and the one or more interactive computing documents by:

encapsulating the workflow data element in a first data container;

spawning one or more second data containers, each encapsulating one or more interactive computing documents of the one or more interactive computing documents based on the workflow data element; and transmitting the one or more second data containers to the at least one cloud-based platform according to the scheme, as defined by the workflow data element.

8. The proxy server of claim 1 further comprising:

a monitoring module, adapted to monitor execution of the one or more scripting code elements of the one or more interactive computing documents by the at least one cloud-based platform; and a rule engine module, adapted to identify a problem in the execution according to a set of predefined runtime rules, based on said monitoring.

9. The proxy server of claim 8, wherein the rule engine module is further configured to communicate a notification message to a relevant client module, wherein the notification message comprises a representation of the identified execution problem, to be displayed on a user interface (UI) of the user development platform.

10. The proxy server of claim 8, wherein the rule engine module is further configured to perform at least one mitigation action, selected from a list consisting of: blocking a user of a specific client module from accessing data stored on the at least one cloud-based platform, changing an access permission of a role of the user of the specific client module to a specific cloud-based platform, deleting data footprints of the at least one scripting code element, and disabling a specific user of the specific client module from executing the one or more scripting code elements in the user development platform.

11. The proxy server of claim 8, wherein monitoring execution of the one or more scripting code elements comprises at least one of: run-time monitoring of logs generated by the at least one cloud-based platform; run-time monitoring of an order of the execution of the one or more scripting code elements; run-time monitoring of output of the execution of the one or more scripting code elements; monitoring duration of execution of the at least one scripting code element of the one or more interactive computing documents; and performing a comparison between output statistics of a current execution of an interactive computing document and output statistics of a previous execution of the interactive computing document.

12. The proxy server of claim 8, wherein monitoring execution of the one or more scripting code elements comprises at least one of:

identifying at least one difference between an output of a specific scripting code element at a first execution and an output of the specific scripting code element at a second execution; and identifying at least one difference between a first metadata element, associated with the specific scripting code element at the first execution and a second metadata element, associated with the specific scripting code element at the second execution.

13. The proxy server of claim 1 further comprising a monitoring module, adapted to:
monitor execution of the one or more scripting code elements of the one or more interactive computing documents by the at least one cloud-based platform;
produce a log data element, representing said monitored execution of the one or more scripting code elements; and
communicate the log data element to a relevant client module, wherein said relevant client module is configured to display said log data element on a UI of the user development platform.

14. A system for providing an interactive development environment, said system comprising:
a proxy server, adapted to interface at least one cloud-based platform; and
one or more client modules operatively connected to the proxy server, each client module associated with a respective user development platform, wherein at least one client module of the one or more client modules is configured to:
receive, from the respective user development platform, one or more interactive computing documents, each representing one or more scripting code elements; and
transmit the one or more interactive computing documents to the proxy server, and wherein the proxy server is configured to:
scan the one or more scripting code elements according to a set of predetermined scripting rules;
encapsulate the one or more interactive computing documents in one or more data containers, based on said scan; and
transmit the one or more data containers to the at least one cloud-based platform, to execute at least one scripting code element of the one or more interactive computing documents;
the proxy server further configured to:
accumulate a subset of scripting code elements, each representing one or more data actions;
classify the subset of scripting code elements, in relation to the at least one client module, to one or more classifications; and
determine at least one script rule based on the one or more classifications; or
obtain, from a machine learning (ML) based model, a confidence score, representing pertinence of the one or more scripting code elements to the one or more classifications; and
determine the at least one script rule based on the confidence score.

15. The system of claim 14, wherein the at least one client module is further configured to:
produce a workflow data element, defining a scheme for executing the one or more interactive computing documents; and
transmit the workflow data element to the to the proxy server, and wherein the proxy server is further configured to:
transmit the one or more data containers and the workflow data element to the at least one cloud-based platform, to execute the one or more interactive computing documents according to the scheme, as defined by the workflow data element.

16. The system of claim 15, wherein the proxy server is further configured to encapsulate the workflow data element with the one or more interactive computing documents in the one or more data containers.

17. The system of claim 14, wherein the proxy server is further configured to, during execution of the one or more interactive computing documents, scan the at least one scripting code element according to the set of predetermined scripting rules, to verify at least one of (a) permission-based legitimacy of data retrieval by the at least one scripting code element, and (b) lack of malicious activity in the at least one scripting code element.

18. A method of providing an interactive development environment, said method comprising:
receiving, by at least one client module associated with a respective user development platform and connected to a proxy server module interfacing at least one cloud-based platform, one or more interactive computing documents, each representing one or more scripting code elements;
transmitting, by the at least one client module, the one or more interactive computing documents to the proxy server module;
scanning the one or more scripting code elements by the proxy server module, according to a set of predetermined scripting rules, wherein the proxy server module configured to:
accumulate a subset of scripting code elements, each representing one or more data actions;
classify the subset of scripting code elements, in relation to the at least one client module, to one or more classifications; and
determine at least one script rule based on the one or more classifications; or
obtain, from a machine learning (ML) based model, a confidence score, representing pertinence of the one or more scripting code elements to the one or more classifications; and
determining the at least one script rule based on the confidence score;
encapsulating, by the proxy server module, the one or more interactive computing documents in one or more data containers, based on said scan; and
transmitting, by the proxy server module, the one or more data containers to the at least one cloud-based platform, to execute at least one scripting code element of the one or more interactive computing documents.

19. The method of claim 18, further comprising:
producing, by the at least one client module, a workflow data element, defining a scheme for executing the one or more interactive computing documents;
encapsulating, by the proxy server module, the workflow data element with the one or more interactive computing documents in the one or more data containers; and
transmitting, by the proxy server module, the one or more data containers to the at least one cloud-based platform, to execute the one or more interactive computing documents according to the scheme, as defined by the workflow data element.

* * * * *